(12) United States Patent
Li

(10) Patent No.: US 8,979,058 B2
(45) Date of Patent: Mar. 17, 2015

(54) TRIPOD HEAD PANEL DEVICE

(75) Inventor: Shuqiang Li, Zhongshan (CN)

(73) Assignee: Lap Shun Manufacture Co., Ltd., Zhongshan (CN)

( * ) Notice: Subject to any disclaimer, the term of this patent is extended or adjusted under 35 U.S.C. 154(b) by 75 days.

(21) Appl. No.: 13/819,707

(22) PCT Filed: Dec. 24, 2010

(86) PCT No.: PCT/CN2010/080223
§ 371 (c)(1),
(2), (4) Date: Apr. 16, 2013

(87) PCT Pub. No.: WO2012/024880
PCT Pub. Date: Mar. 1, 2012

(65) Prior Publication Data
US 2013/0193294 A1  Aug. 1, 2013

(30) Foreign Application Priority Data

Sep. 1, 2010 (CN) .......................... 2010 1 0268777

(51) Int. Cl.
*F16M 11/04* (2006.01)
*G03B 17/56* (2006.01)
*F16M 11/14* (2006.01)

(52) U.S. Cl.
CPC .......... *G03B 17/561* (2013.01); *F16M 11/041* (2013.01); *F16M 11/14* (2013.01); *G03B 17/566* (2013.01); *F16M 2200/022* (2013.01)
USPC ..................... 248/371; 248/181.1; 248/187.1; 396/428

(58) Field of Classification Search
CPC .... F16M 11/041; F16M 11/04; G03B 17/561
USPC ............. 248/371, 181.1, 187.1; 396/419, 428
See application file for complete search history.

(56) References Cited

U.S. PATENT DOCUMENTS 2,180,214 A   11/1939 Rapp
4,525,052 A *  6/1985 Kosugi et al. ................. 396/419
(Continued)

FOREIGN PATENT DOCUMENTS

CN         2888486 Y      4/2007
CN       201156152 Y     11/2008
(Continued)

OTHER PUBLICATIONS

International Search Report mailed Jun. 2, 2011, in International Application No. PCT/CN2010/080223, filed Dec. 24, 2010, 5 pages.
(Continued)

*Primary Examiner* — Terrell McKinnon
*Assistant Examiner* — Daniel Breslin
(74) *Attorney, Agent, or Firm* — Christensen O'Connor Johnson Kindness PLLC

(57) ABSTRACT

A tripod head panel device of a tripod head comprises a tripod head panel and a removably mounted snap-fit plate. The tripod head panel comprises a fixed plate, a moveable plate mounted underneath the fixed plate, and a driving plate mounted underneath the moveable plate. The fixed plate comprises a supporting base plate and a first retaining wall protruding upward from the supporting base plate. The moveable plate comprises a supporting base plate and a second retaining wall protruding upward from the supporting base plate, with a driving hole provided in the center of the moveable plate. The driving plate comprises a base mounted underneath the moveable plate and a handle extending from an end of the base, with an offset cam inside the driving hole formed on the seat. The snap-fit plate is mounted on the supporting base plate between the first and the second retaining walls.

9 Claims, 7 Drawing Sheets

(56) References Cited

U.S. PATENT DOCUMENTS

| | | | |
|---|---|---|---|
| 4,929,973 A * | 5/1990 | Nakatani | 248/177.1 |
| 6,196,504 B1 * | 3/2001 | Lemke | 248/187.1 |
| 6,234,690 B1 * | 5/2001 | Lemieux | 396/419 |
| 6,773,172 B1 * | 8/2004 | Johnson et al. | 396/428 |
| 6,994,504 B2 * | 2/2006 | Gordon | 411/508 |
| 7,185,862 B1 * | 3/2007 | Yang | 248/187.1 |
| 8,256,726 B2 * | 9/2012 | Bordignon | 248/187.1 |
| 8,348,214 B2 * | 1/2013 | Vogt | 248/316.4 |
| 8,356,948 B2 * | 1/2013 | Onishi et al. | 396/419 |
| 8,477,240 B2 * | 7/2013 | Kang | 348/375 |
| 8,628,258 B2 * | 1/2014 | Vogt | 396/428 |
| 8,794,575 B2 * | 8/2014 | Vogt | 248/177.1 |
| 8,827,219 B2 * | 9/2014 | Kessler et al. | 248/187.1 |
| 8,827,577 B2 * | 9/2014 | Johnson | 396/428 |
| 2004/0146293 A1 * | 7/2004 | DeSorbo et al. | 396/428 |
| 2010/0181454 A1 * | 7/2010 | Vogt | 248/309.1 |
| 2012/0145864 A1 * | 6/2012 | Vogt | 248/316.2 |

FOREIGN PATENT DOCUMENTS

| | | |
|---|---|---|
| CN | 201340508 Y | 11/2009 |
| CN | 201368301 Y | 12/2009 |
| CN | 101922599 A | 12/2010 |
| CN | 101922600 A | 12/2010 |
| CN | 201795241 U | 4/2011 |
| JP | 10-288811 A | 10/1998 |
| JP | 2005-90730 A | 4/2005 |

OTHER PUBLICATIONS

Written Opinion of the International Searching Authority mailed Jun. 2, 2011, in International Application No. PCT/CN2010/080223, filed Dec. 24, 2010, 7 pages.

* cited by examiner

TRIPOD HEAD PANEL DEVICE

FIELD

The present application relates to photographic equipment, in particular, to a panel device of a tripod head.

BACKGROUND

Both amateur photographers and professional photographers are eager to quickly, accurately, and stably fix a camera or video camera onto a tripod, so as to shoot those passing pictures or images.

To achieve the above, people have to use expensive tripods that have tripod heads with very complex structures. Meanwhile, installation of the camera or video camera onto the tripod head and the subsequent adjustments are very complicated. After finishing the adjustments, the photographer may have missed a good opportunity to capture a great image.

Therefore, to overcome the above deficiencies, there is an urgent need for a reliable tripod head panel device that is simple in structure and is quick to install.

SUMMARY

Disclosed herein is a panel device of a tripod head.

According to at least one embodiment, a tripod head panel device includes a tripod head panel and a snap-fit plate removably mounted on the tripod head panel. The tripod head panel includes a fixed plate, a moveable plate mounted underneath the fixed plate, and a driving plate mounted underneath the moveable plate. The fixed plate includes a supporting base plate and a first retaining wall protruding upward from the supporting base plate. The moveable plate includes a supporting base plate and a second retaining wall protruding upward from the supporting base plate of the moveable plate. The moveable plate is provided with a driving hole. The driving plate includes a base mounted underneath the moveable plate and a handle extending from an end of the base, while an eccentric cam formed on the seat is provided inside the driving hole. The snap-fit plate is mounted on the supporting base plate of the moveable plate, and is provided between the first and the second retaining walls.

The tripod head panel device described herein is simple in structure, quick to install, and is reliable. Therefore, it is easy to fix a camera or other equipment onto the tripod head panel.

DETAILED DESCRIPTION

The invention is best understood by reference to the following description taken in conjunction with the accompanying drawings.

Figure 1:
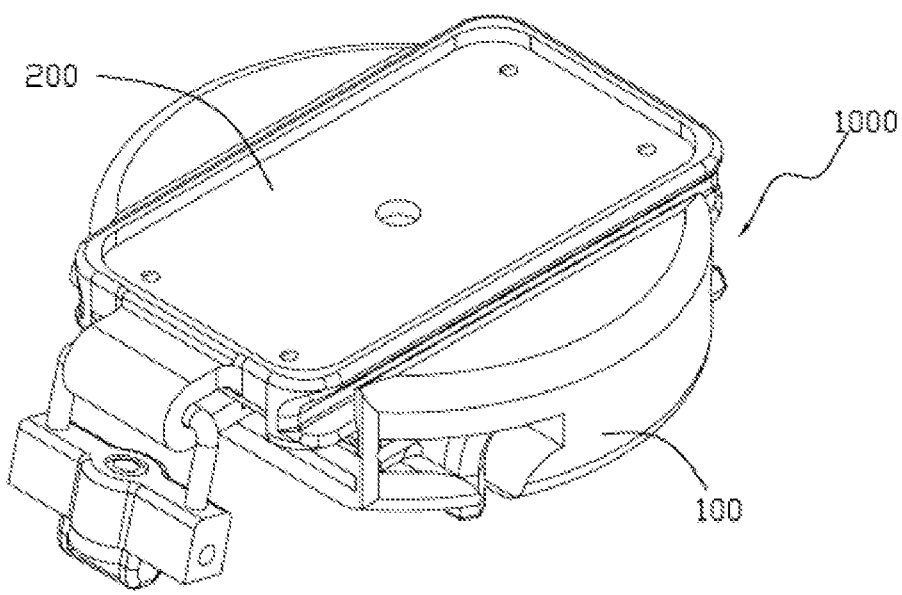
FIG. 1 is a perspective view of the tripod head panel device of one embodiment of the present invention.
Figure 2:
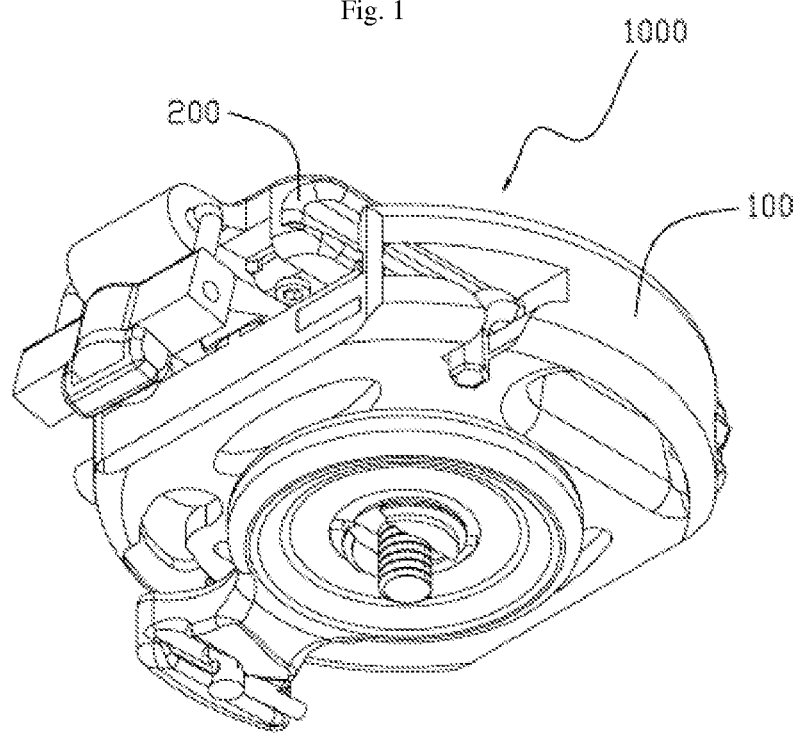
FIG. 2 is a perspective view of the tripod head panel device of FIG. 1 viewed from another direction.
Figure 3:
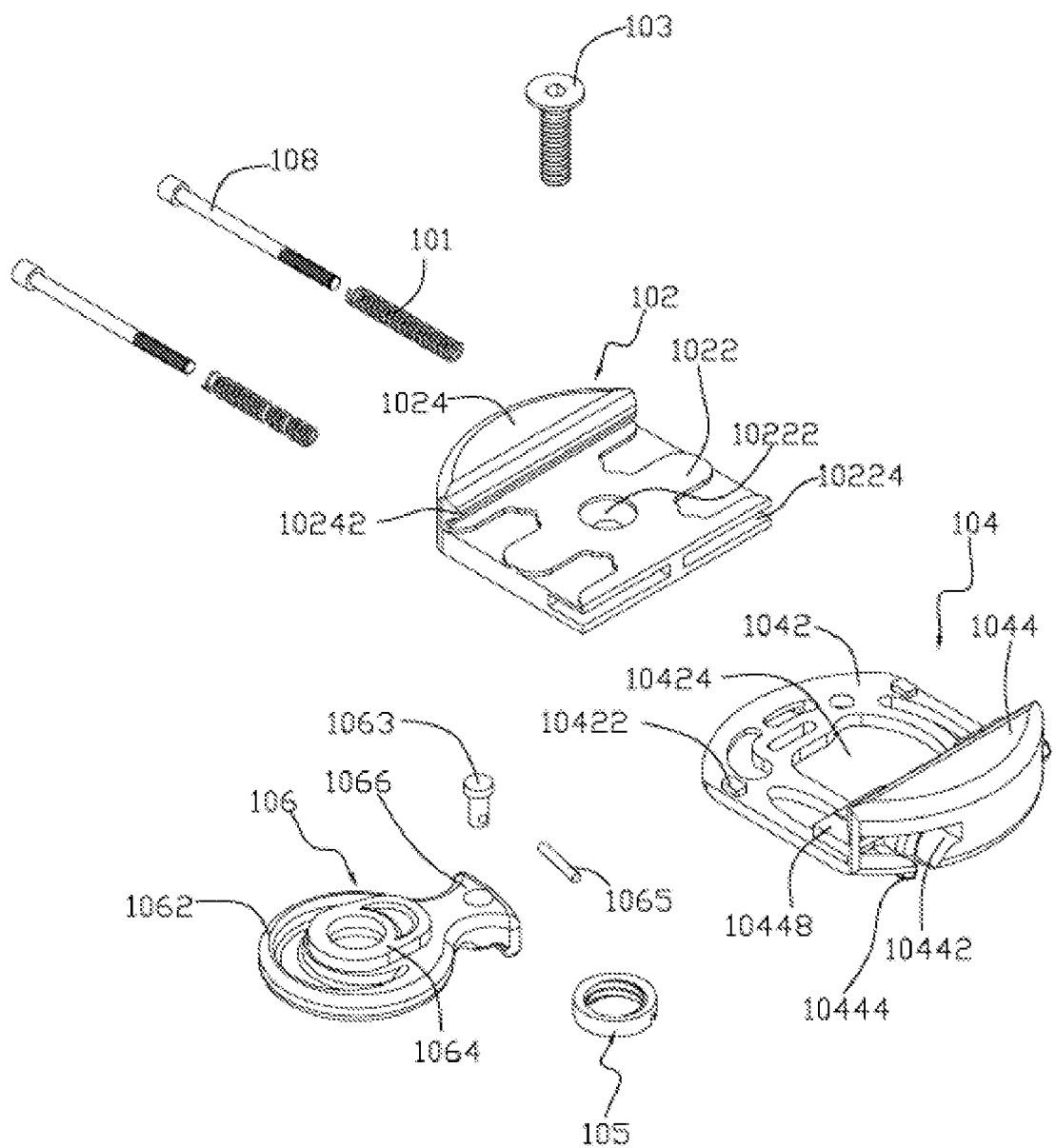
FIG. 3 is an exploded view of the tripod head panel of the tripod head panel device of the present invention.
Figure 4:
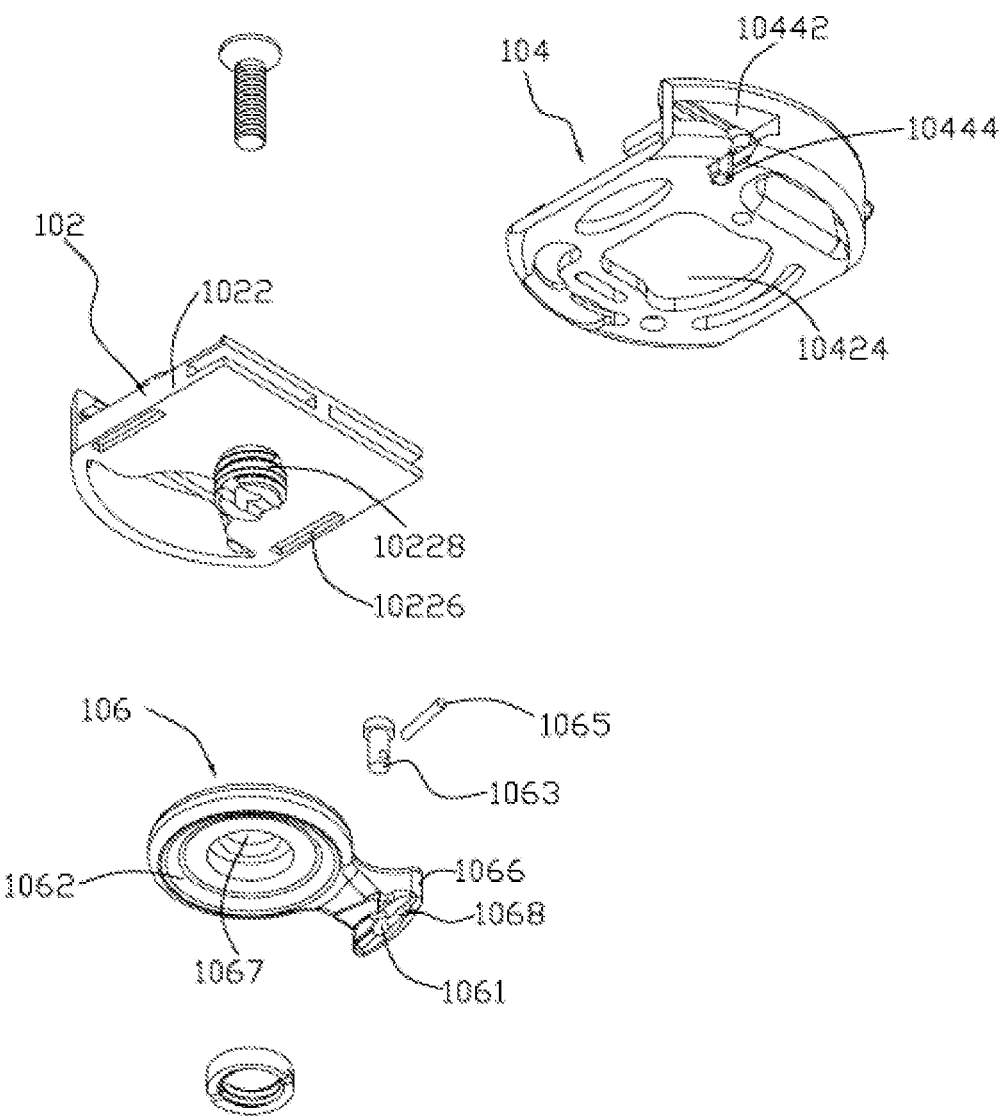
FIG. 4 is a perspective view of the tripod head panel of FIG. 3 viewed from another direction.
Figure 5:
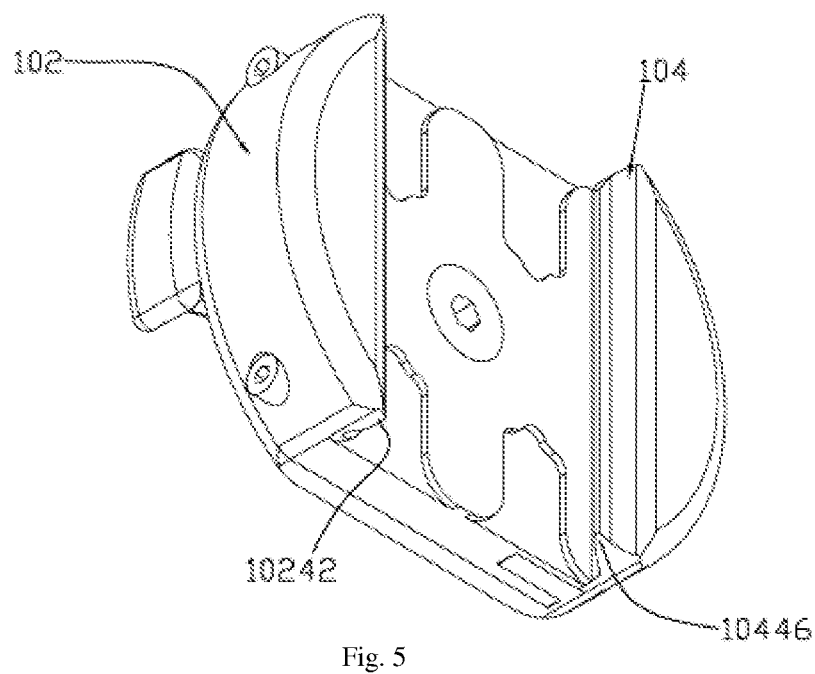
FIG. 5 is an assembly view of the tripod head panel of the tripod head panel device of one embodiment of the present invention.

Referring to FIGS. 1 and 2, a tripod head panel device 1000 includes a tripod head panel 100 and a snap-fit plate 200 removably mounted to the tripod head panel 100.

The structure of the tripod head panel 100 and the snap-fit plate 200 will now be described.

Referring to FIGS. 3-6, the tripod head panel 100 includes a fixed plate 102, a movable plate 104 mounted at the bottom of the fixed plate 102 which can elastically slide on the tripod head panel 100, and a driving plate 106 rotatably mounted at the bottom of the movable plate 104, so as to facilitate the movable plate 104 to slide on the fixed plate 102.

The fixed plate 102 includes a supporting base plate 1022 supporting the snap-fit plate 200, and a first retaining wall 1024 protruding upward from an edge of the supporting base plate 1022. An axle hole 10222 is provided at the center of the supporting base plate 1022. A plurality of guiding grooves 10224, such as two, are provided on the side of the supporting base plate 1022 which is opposite the first retaining wall 1024, so as to guide the movable plate 104 to slide with respect to the fixed plate 102. A positioning column 10228 is formed by extending downward from the center at the bottom of the supporting base plate 1022, and the axle hole 10222 passes through the positioning column 10228. In addition, a pair of slide grooves 10226 are provided on the bottom of the supporting base plate 1022 to further guide the movable plate 104 to slide with respect to the fixed plate 102. Furthermore, a first spine 10242 is formed on the first retaining wall 1024 (referring to FIG. 5).

The movable plate 104 includes a supporting base plate 1042 supporting the snap-fit plate 200, and a second retaining wall 1044 protruding upward from an edge of the supporting base plate 1042. A driving hole 10424 is provided at the center of the movable plate 104, configured to allow the proper components of the driving plate 106 to rotate eccentrically inside. In addition, two sides of the end of the movable plate 104 opposite the second retaining wall 1044 extend upwards, respectively, forming slide blocks 10422 that fit the slide groove 10226 of the fixed plate 102. A second spine 10446 is further formed in the second retaining wall 1044 (referring to FIG. 5). A guide block 10448 fitting the guiding grooves 10224 of the fixed plate 102 is formed on the second retaining wall 1044 by extending upward horizontally. In addition, a notch 10442 is provided downwardly at the bottom of the second retaining wall 1044. The notch 10442 protrudes downward to form a lock column 10444.

The detailed structure of the driving plate 106 will now be described. The driving plate 106 is rotatably mounted at the bottom of the movable plate 104. The movable plate 104 can slide with respect to the fixed plate 102 by turning the driving plate 106. The driving plate 106 includes a base 1062 and a handle 1066 extending from one end of the base 1062. An eccentric cam 1064 is formed on the base 1062, which can eccentrically rotate inside the driving hole 1062 of the movable plate 104 (referring to FIGS. 3 and 6). A perforation 1067 corresponding to the axle hole 10222 of the fixed plate 102 is provided longitudinally on the eccentric cam 1064. A through hole 1061 is provided longitudinally on the handle 1066, which can be passed through by a lock pin 1063. The lock pin 1063 can be rotatably mounted on the handle 1066 by a dowel pin 1065 that longitudinally passes through the lock pin 1063.

The fixed plate 102 is positioned on the supporting base plate 1042 of the movable plate 104. The slide blocks 10422 of the movable plate 104 are respectively arranged in the corresponding slide grooves 10226 of the fixed plate 102. The guide block 10448 of the movable plate 104 is inserted into corresponding guiding groove 10244 of the fixed plate 102. The first retaining wall 1024 of the fixed plate 102 and the second retaining wall 1044 of the movable plate 104 are parallel to each other, forming a gap of certain width between the first and second retaining walls 1024 and 1044, so as to mount the snap-fit plate 200 therebetween. The driving plate 106 is arranged at the bottom of the movable plate 104. The eccentric cam 1064 of the driving plate 106 is eccentrically arranged in the driving hole 10424 of the movable plate 104.

In addition, the positioning column 10228 of the fixed plate 102 inserts into the perforation 1067 of the eccentric cam 1064 and finally inserts into the perforation 1067 of the driving plate 106. A pair of screw rods 108 respectively pass through the first retaining wall 1024 of the fixed plate 102 and the corresponding guiding groove 10224, then abut on corresponding guide block 10448 of the movable plate 104. An extension spring 101 is formed on each screw rod 108. When the spring 101 is stretched, there is a tendency between the fixed plate 102 and the movable plate 104 to approach each other.

The fixed plate 102, the movable plate 104, and the driving plate 106 are fixed in this manner: first, the screw 103 extends and passes through the axle hole 10222 of the fixed plate 102 and protrudes outward from the bottom of the driving plate 106; then, the nut 105 is fixed on the screw 103, such that the fixed plate 102, the movable plate 104, and the driving plate 106 are fixed with each other.

Figure 6:
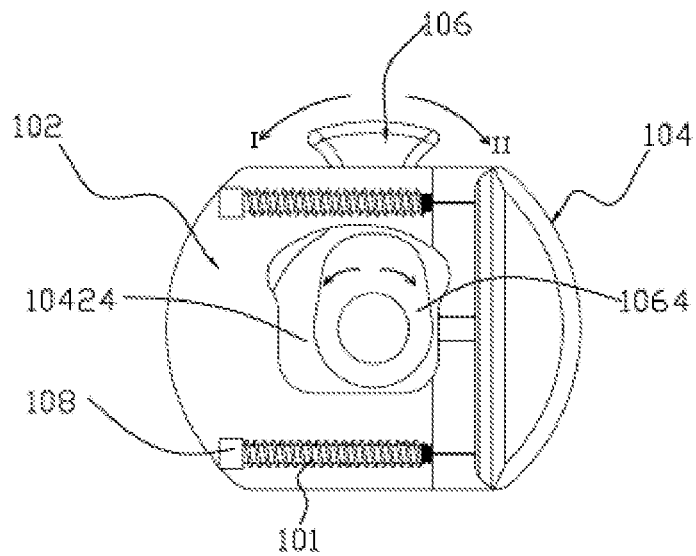
FIG. 6 is the moving principle of the snap-fit plate of the tripod head panel device of one embodiment of the present invention.
Figure 7:
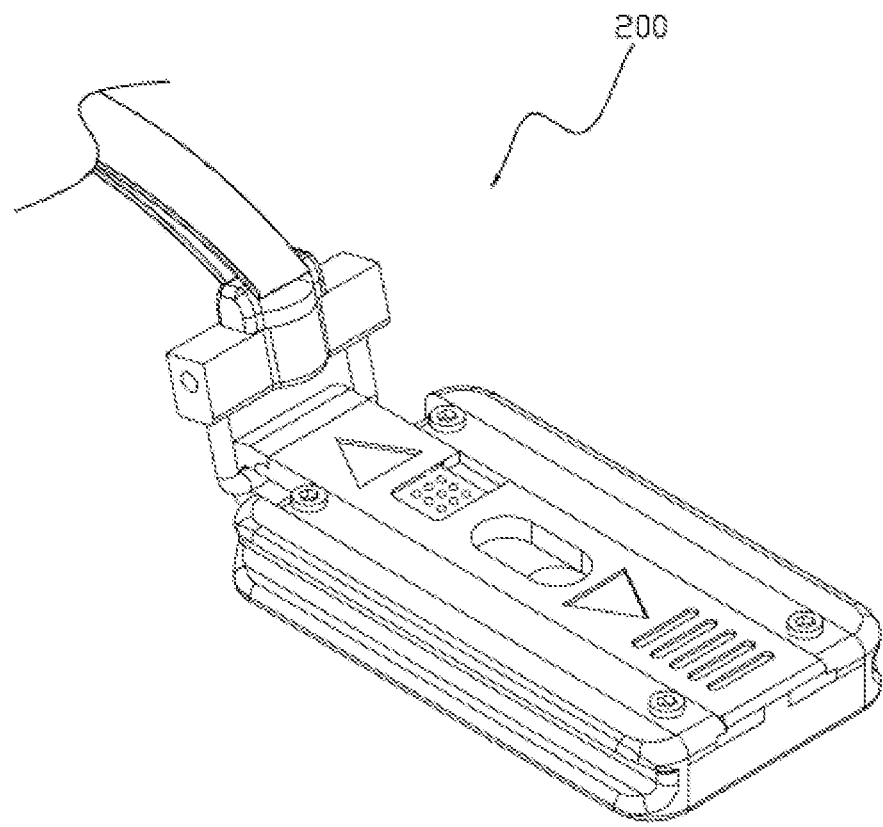
FIG. 7 is a perspective view of the snap-fit plate of the tripod head panel device of one embodiment of the present invention.
Figure 8:
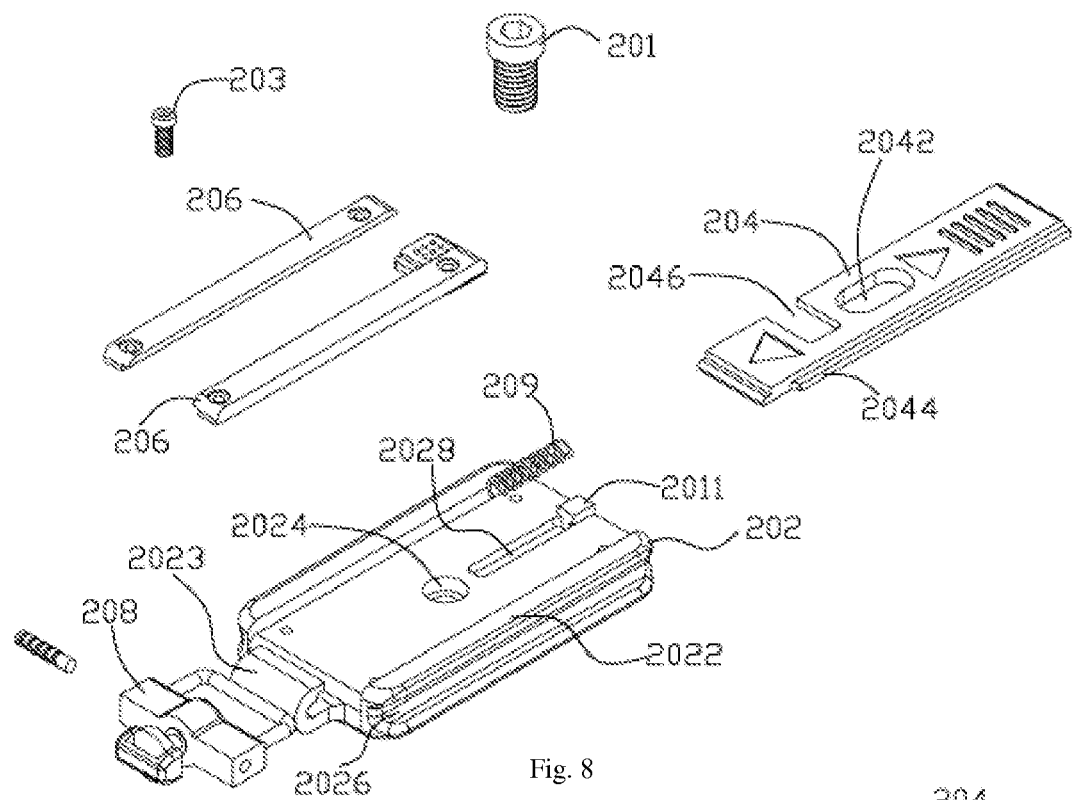
FIG. 8 is an exploded view of the snap-fit plate of FIG. 7.
Figure 9:
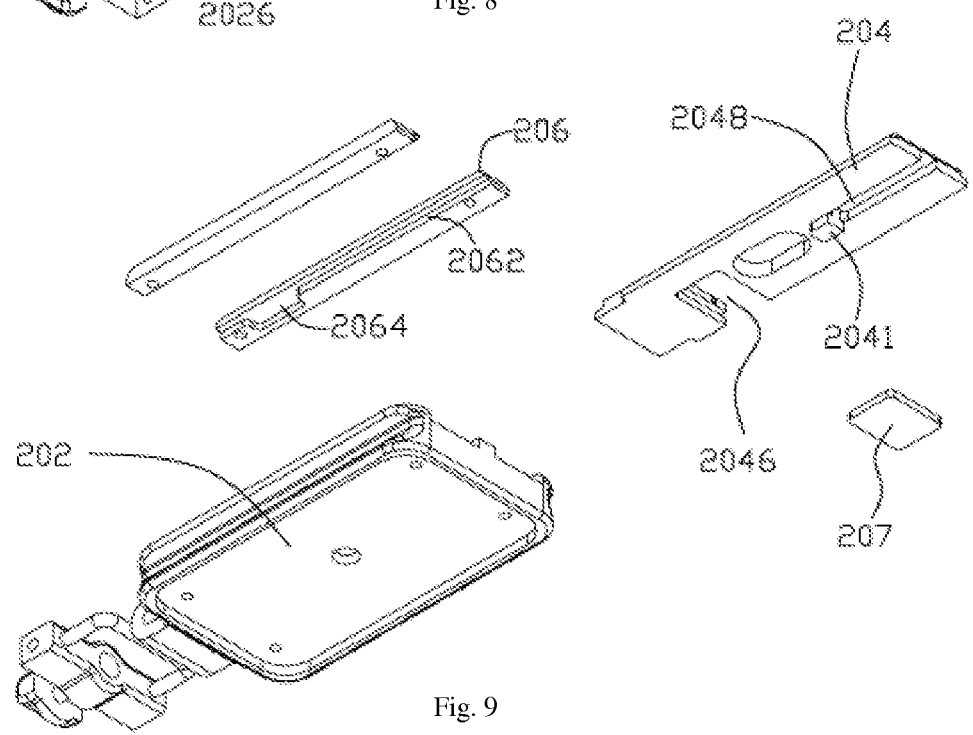
FIG. 9 is an exploded view of the snap-fit plate of FIG. 7 viewed from another direction.
Figure 10:
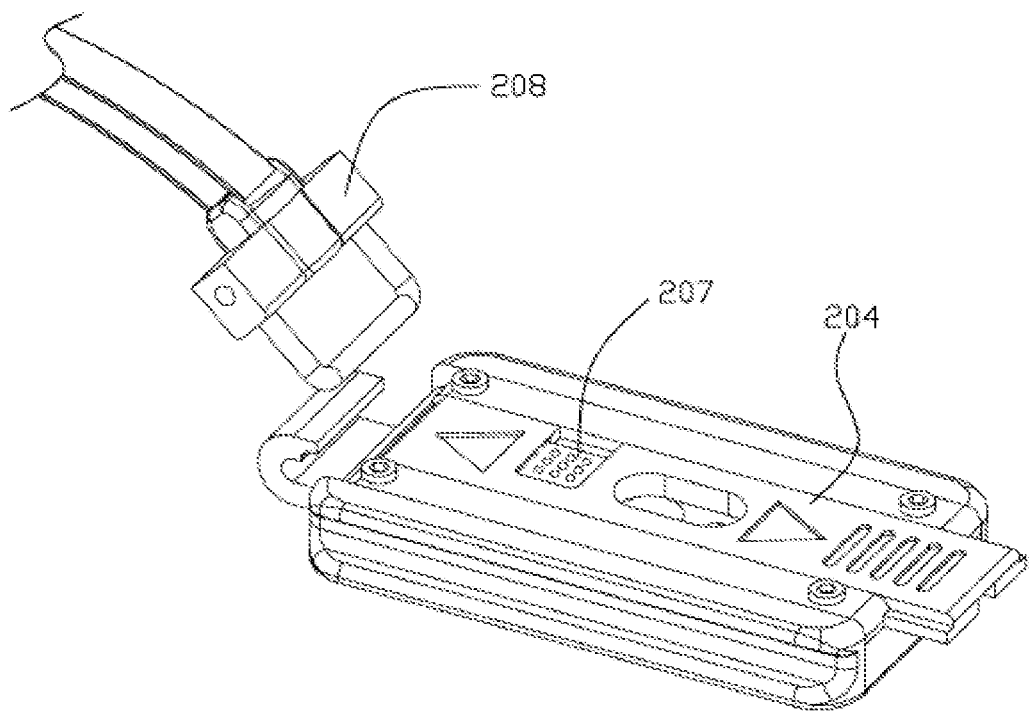
FIG. 10 is the moving process of the snap-fit plate of FIGS. 7-9.

The operation principle of the tripod head 100 will now be described. Referring to FIG. 6, when the eccentric cam 1064 is not in touch with the driving hole 10424, the distance between the fixed plate 102 and the movable plate 104 is the smallest. When turning the driving plate 106 along direction II, the eccentric cam 1064 drives the movable plate 104 toward the right, so as to allow the movable plate 104 and the fixed plate 102 to move further away from each other, thereby increasing the distance between the first retaining wall 10242 and the second retaining wall 10446. At the moment, the snap-fit plate 200 can be easily positioned between the two retaining walls. When turning the driving plate 106 along direction I, the eccentric cam 1064 drives the movable plate 104 toward the left, so as to allow the movable plate 104 to become closer to the fixed plate 102. At the moment, the snap-fit plate 200 can be tightly fixed between the two retaining walls, thereby preventing the snap-fit plate 200 from becoming loose and falling down.

To prevent the driving plate 106 from turning back to its previous position after rotating a certain angle, the driving plate 106 can be locked. Specifically, by pulling the dowel pin 1065 onto the slope 1068, the lock pin 1063 will protrude downwards, so as to allow the lock pin 1063 to be inserted into the notch 10442 of the movable plate 104, thereby preventing the driving plate 106 from being rotated. By reverse operation, the locking can be released.

A through hole 1061 is provided longitudinally in the handle 1066 for passing through a lock pin 1063. The lock pin 1063 can be rotatably mounted on the handle 1066 by a dowel pin 1065 longitudinally passing through the lock pin 1063. In addition, a slope 1068 is formed at the bottom of the handle 1066.

The structure of the snap-fit plate 200 will now be described. Referring to FIGS. 7-10, the snap-fit plate 200 includes a slide seat 202, a pair of limiting bars 206 mounted on two sides of the slide seat 202 and a slider 204 capable of sliding on the slide seat 202 provided between the limiting bars 206.

Flanges 2022 are formed by the two longitudinally protruding edges of the slide seat 202. Longitudinally extending slideways 2026 are formed inside the flanges 2022. Each of the slideways 2026 corresponds respectively to the first and second spines 10242 and 10446 of the head panel 100. The slide seat 202 is provided on the supporting base plate 1022 of the fixed plate 102 of the tripod head panel 100, and the first and second spines 10242 and 10446 of the tripod head panel 100 are respectively fitted into corresponding slideways 2026, such that the snap-fit plate 200 can slide on the head panel 100.

A fixing hole 2024 is provided at the center of the slide seat 202, and a first groove 2028 is provided longitudinally at the back end of the slide seat 202. A first limiting block 2021 is formed at the end of the first groove 2028. In addition, the head of the slide seat 202 is bent to form a hook 2023.

The two limiting bars 206 are fixed in the inner side of the flanges 2022 of the slide seat 202 respectively, for example, by the screws 2031. A step 2026 is provided longitudinally at the bottom of each limiting bar 206. In addition, one of the limiting bars 206 is provided with a slot 2064 at the bottom.

A longitudinally extending slide hole 2042 is provided at the center of the slider 204. A plate-locking slot 2046, corresponding to the slot of one of the limiting bars 206 with a locking plate 207 capable of horizontally sliding set inside, is formed in the head of the slider 204. In addition, a second groove 2048, which corresponds to the first groove 2028 of the slide seat 202, is provided at the bottom of the slider 204. A second limiting block 2041 is formed at the end of the second groove.

In addition, slide rails 2044 corresponding to the steps 2026 of the limiting bars 206 are formed on both sides of the slider 204. The slider 204 is provided on the slide seat 202 between the two limiting bars 206. The two slide rails 2044 of the slider 204 are respectively provided between the two steps 2062 of the limiting bars 206, so as to allow the slider 204 to move longitudinally relative to the slide seat 202. The limit column 201 passing through the slide hole 2042 of the slider 204 is fixed in the fixing hole 2024 of the slide seat 202, so as to limit the longitudinal moving range of the slider 204.

Preferably, in order to get back to its original position after the slider 204 has moved a given distance, a pressure spring 209 may be mounted between the first limiting block 2021 and the second limiting block 2041. The pressure spring 209 may be arranged between the space defined both by the first groove 2028 and the second groove 2048.

Preferably, in order to limit the slider 204 in a certain position, the locking plate 207 in the locking-plate slot 2046 can be turned into the slot 2064 of the limiting bar 206.

Furthermore, a retaining ring 208 can be fitted into the hook 2023 of the slide seat 202.

What is claimed is:
1. A tripod head panel device, comprising:
 a tripod head panel; and
 a snap-fit plate removably mounted on the tripod head panel,
 the tripod head panel comprising a fixed plate, a moveable plate mounted underneath the fixed plate, and a driving plate mounted underneath the moveable plate, wherein:
the fixed plate comprises a supporting base plate and a first retaining wall protruding upward from the supporting base plate, with an axle hole provided at the center of the supporting base plate of the fixed plate;
the moveable plate comprises a supporting base plate and a second retaining wall protruding upward from the supporting base plate of the moveable plate, with a driving hole provided in the center of the moveable plate;
the driving plate comprises a base mounted underneath the moveable plate and a handle extending from an end of the base, with an eccentric cam inside the driving hole formed on the base; and
the snap-fit plate is mounted on the supporting base plate of the moveable plate between the first and the second retaining walls;
a perforation corresponding to the axle hole of the fixed plate is provided longitudinally on the eccentric cam;
a positioning column extends downward from the center of the bottom of the supporting base plate of the fixed plate, with the axle hole allowing through the positioning column, the positioning column inserting into the perforation, and finally protruding from the bottom of the driving plate by a screw; and
by a nut fixed on the screw, the fixed plate, the movable plate, and the driving plate are fixed with each other.

2. The tripod head panel device of claim 1, wherein:
one or more guiding grooves are provided on the side of the supporting base plate of the fixed plate which is opposite to the first retaining wall;
a pair of slide grooves are provided on the bottom of the supporting base plate of the fixed plate;
two sides of the end of the movable plate opposing to the second retaining wall extend upwards respectively, forming slide blocks;
a guide block extending upward horizontally fitting the guiding grooves of the fixed plate is formed on the second retaining wall;
the fixed plate is provided on the supporting base plate of the movable plate;
the slide blocks of the movable plate are respectively arranged in the corresponding slide grooves of the fixed plate;
the guide block of the movable plate is inserted into the corresponding guiding groove of the fixed plate;
the first retaining wall of the fixed plate and the second retaining wall of the movable plate are parallel to each other, forming a gap of certain width between the two retaining walls, so as to mount the snap-fit plate therebetween;
a pair of screw rods pass through the first retaining wall and the guiding grooves respectively, and abut on the corresponding guide block; and
each of the screw rods are provided with an extension spring.

3. The tripod head panel device of claim 2, wherein:
a through hole is provided longitudinally on the handle, with a lock pin passing through thereby;
the lock pin is rotatably mounted on the handle by a dowel pin longitudinally passing through the lock pin; and
the bottom of the handle is a slope.

4. The tripod head panel device of claim 3, wherein the snap-fit plate comprises a slide seat having a head, a center, and a back end, a pair of limiting bars mounted on two sides of the slide seat, and a slider capable of sliding on the slide seat provided between the limiting bars, the slider having a head, a center, and a bottom.

5. The tripod head panel device of claim 4, wherein:
a first spine is formed on the first retaining wall;
a second spine is formed on the second retaining wall;
flanges are formed by two longitudinally protruding edges of the slide seat;
longitudinally extending slideways are formed inside the flanges;
the slide seat is provided on the supporting base plate of the fixed plate of the tripod head panel; and
the first and second spines of the tripod head panel are respectively fitted into corresponding slideways.

6. The tripod head panel device of claim 5, wherein:
a fixing hole is provided at the center of the slide seat, and a first groove is provided longitudinally at the back end of the slide seat;
a first limiting block is formed at the end of the first groove;
the head of the slide seat is bent to form a hook;
the two limiting bars are fixed in the inner side of the flanges of the slide seat, respectively;
a step is provided longitudinally at the bottom of each limiting bar, where one of the limiting bars is provided with a slot at the bottom;
a longitudinally extending slide hole is provided at the center of the slider;
a plate-locking slot, corresponding to the slot of one of the limiting bars with a locking plate capable of horizontally sliding set inside, is formed in the head of the slider;
a second groove, which corresponds to the first groove of the slide seat, is provided at the bottom of the slider;
a second limiting block is formed at the end of the second groove;
slide rails corresponding to the steps of the limiting bars are formed on both sides of the slider;
the slider is provided on the slide seat between the two limiting bars;
the two slide rails of the slider are respectively provided between the two steps of the limiting bars; and
a limit column passing through the slide hole of the slider is fixed in the fixing hole of the slide seat.

7. The tripod head panel device of claim 6, wherein a pressure spring is mounted between the first groove and the second groove.

8. The tripod head panel device of claim 7, wherein a retaining ring is provided inside the hook of the slide seat.

9. The tripod head panel device of claim 8, wherein a notch is provided downwardly at the bottom of the second retaining wall, the notch protruding downward to form a lock column.

* * * * *